(12) United States Patent
Brawer et al.

(10) Patent No.: US 12,136,121 B2
(45) Date of Patent: Nov. 5, 2024

(54) METHODS, MANUFACTURES, AND SYSTEMS FOR PRODUCT DETECTION ON MERCHANT WEBSITES

(71) Applicant: PAYPAL, INC., San Jose, CA (US)

(72) Inventors: Michael Brawer, Santa Barbara, CA (US); David Phillips, Edgewood, WA (US); Anthony Le, Irvine, CA (US); Kaan Erdener, Lafayette, CO (US)

(73) Assignee: PAYPAL, INC., San Jose, CA (US)

( * ) Notice: Subject to any disclaimer, the term of this patent is extended or adjusted under 35 U.S.C. 154(b) by 185 days.

(21) Appl. No.: 17/562,803

(22) Filed: Dec. 27, 2021

(65) Prior Publication Data
US 2023/0206312 A1    Jun. 29, 2023

(51) Int. Cl.
*G06Q 30/00* (2023.01)
*G06F 40/134* (2020.01)
*G06F 40/14* (2020.01)
*G06Q 30/0601* (2023.01)
*G06Q 30/0251* (2023.01)

(52) U.S. Cl.
CPC ....... *G06Q 30/0641* (2013.01); *G06F 40/134* (2020.01); *G06F 40/14* (2020.01); *G06Q 30/0603* (2013.01); *G06Q 30/0253* (2013.01)

(58) Field of Classification Search
CPC ...... G06Q 30/0601–0645; G06Q 30/08; G06F 40/14; G06F 40/134
USPC .............................................. 705/26.1–27.2
See application file for complete search history.

(56) References Cited

U.S. PATENT DOCUMENTS

| 10,452,730 B2 * | 10/2019 | Scoda ................. G06F 16/9538 |
| 10,467,615 B1 | 11/2019 | Omojola et al. |
| 11,210,731 B1 * | 12/2021 | Croak .................. G06Q 20/202 |
| 2008/0091546 A1 * | 4/2008 | Kirovski ............ G06Q 30/0629 705/26.64 |

(Continued)

FOREIGN PATENT DOCUMENTS

CN         109658156 A       4/2019

OTHER PUBLICATIONS

Sibley, Ben, Top 5 Best Price Comparison WordPress Plugins, Competethemes.com, May 10, 2019, accessed at [https://www.competethemes.com/blog/price-comparison-wordpress-plugins/] (Year: 2019).*

*Primary Examiner* — Jeffrey A. Smith
*Assistant Examiner* — Lindsey B Smith
(74) *Attorney, Agent, or Firm* — .Haynes and Boone, LLP

(57) ABSTRACT

Methods and systems are presented for enhancing a merchant product webpage by providing additional content associated with a product being displayed on the merchant product webpage. A product catalog stores product records corresponding to data associated with different products. As a webpage is accessed by a user device, data is extracted from the merchant product webpage. The extracted data is used to identify one or more product records in the product catalog that are potential matches to the webpage. When multiple product records are identified, a remote server is used to access and interact with the webpage separate from the user device. Additional data is extracted from the webpage based on interactions by the remote server with the webpage. The additional data is used to determine a single product record for the webpage. The webpage is modified based on the single product record.

20 Claims, 11 Drawing Sheets

(56) References Cited

U.S. PATENT DOCUMENTS

| | | | |
|---|---|---|---|
| 2013/0332442 A1* | 12/2013 | Liu | G06Q 30/0267 707/709 |
| 2015/0046308 A1 | 2/2015 | Sharma | |
| 2016/0300295 A1* | 10/2016 | Westphal | G06Q 30/0633 |
| 2020/0334701 A1* | 10/2020 | Henderson | G06Q 30/0641 |
| 2021/0224704 A1 | 7/2021 | Waldo, IV et al. | |

* cited by examiner

```
"brand": "American Eagle Outfitters",
"canonicalUrl": "https://www.ae.com/us/en/p/men/athletic-fit-jeans/athletic-fit-jeans/ae-airflex-athletic
-fit-jean/0118_5307_001",
"categories": ["Men", "Bottoms", "Jeans", "Athletic Fit Jeans"],
"currency": "USD",
"defaultTags": ["airflex", "jean", "athletic", "fit"],
"description": "Your go-to slim fit, designed with extra room in the thigh.    \n • AirFlex+ \n • Authentic deni
m look with flexibility and comfort you have to feel to believe. \n • High stretch level that keeps its shape \n
 • Light wash - wear it like you mean it \n • Style:  0118-5362  | Color:  915  \n Materials & Care    \n • 99% C
otton, 1% Elastane \n • Color may transfer when new: wash separately in cold water before wearing. Machi
ne wash: cold, inside out and with like colors. Do not bleach, wring or twist. Tumble dry low. Cool iron if ne
eded. \n • Imported  \n\n\n \n • A slim fit designed for the guy who needs a little extra room in the thigh \
n • Relaxed through thigh with a subtle tapered leg \n • Slim 13.5\" leg opening \n •    \n  \n  \n • Fit based
on  \n406 Reviews      \n  \n  \n: \nSmall  \nLarge",
"imageUrlPrimary": "https://i.honey-images.com/v4/9_acc01cde7be9370b969f94756fce787e.jpg",
"priceCurrent": 69.00,
"productDetails": { "color": "Light Wash"  },
```

Figure 4

```
Current_Page(
    storeId = "American Eagle"
    Title = "AE AirFlex+ Athletic Fit Jean - Light Wash"
    Price = 59.00
    URL ="https://www.ae.com/us/en/p/men/athletic-fit-jeans/athletic-fit-jeans/ae-airflex-athletic-fit-jean/0118_5307_001"
}
```

METHODS, MANUFACTURES, AND SYSTEMS FOR PRODUCT DETECTION ON MERCHANT WEBSITES

BACKGROUND

The present specification generally relates to data extraction from webpages, and more specifically, to detecting and verifying product and currency information from a merchant webpage according to various embodiments of the disclosure.

RELATED ART

Extracting content from third-party webpages can be useful. For example, a service provider may extract content from webpages that a user is currently browsing, and may then provide services to the user based on the extracted content. When the user is browsing a merchant webpage (e.g., during online shopping) associated with a product, the services may include providing additional information associated with the product, such as additional descriptions and/or user reviews of the product, a price trend of the product, prices of the product offered by other merchants, etc. However, it can be a challenge to extract some types of information from a webpage, because the content that is directly extracted from the webpage can be limited. For example, while a price of a product can be extracted by parsing through a source file associated with the webpage and/or scraping the webpage, a currency associated with the price may not be derived as easily since many different currencies share a common currency symbol. In addition, the product that is being presented on a webpage can be difficult to identify in some cases as well. For example, the webpage may provide incomplete, incorrect, and/or fragmented product description for the product such that it can be challenging to match the product presented on the website with the same product presented on another website. As such, a user may not be provided with information or data that allows the user to make a more informed purchase decision, which can result in abandoned transactions or returns that would require the service provider to expend computing resources to process. Thus, there is a need for efficiently and accurately determining certain content within websites to overcome problems discussed above.

BRIEF DESCRIPTION OF THE FIGURES

FIG. 4 illustrates an exemplary product record according to an embodiment of the present disclosure;

FIG. 5 illustrates an exemplary data structure for storing data extracted from a webpage according to an embodiment of the present disclosure;

Figure 1:
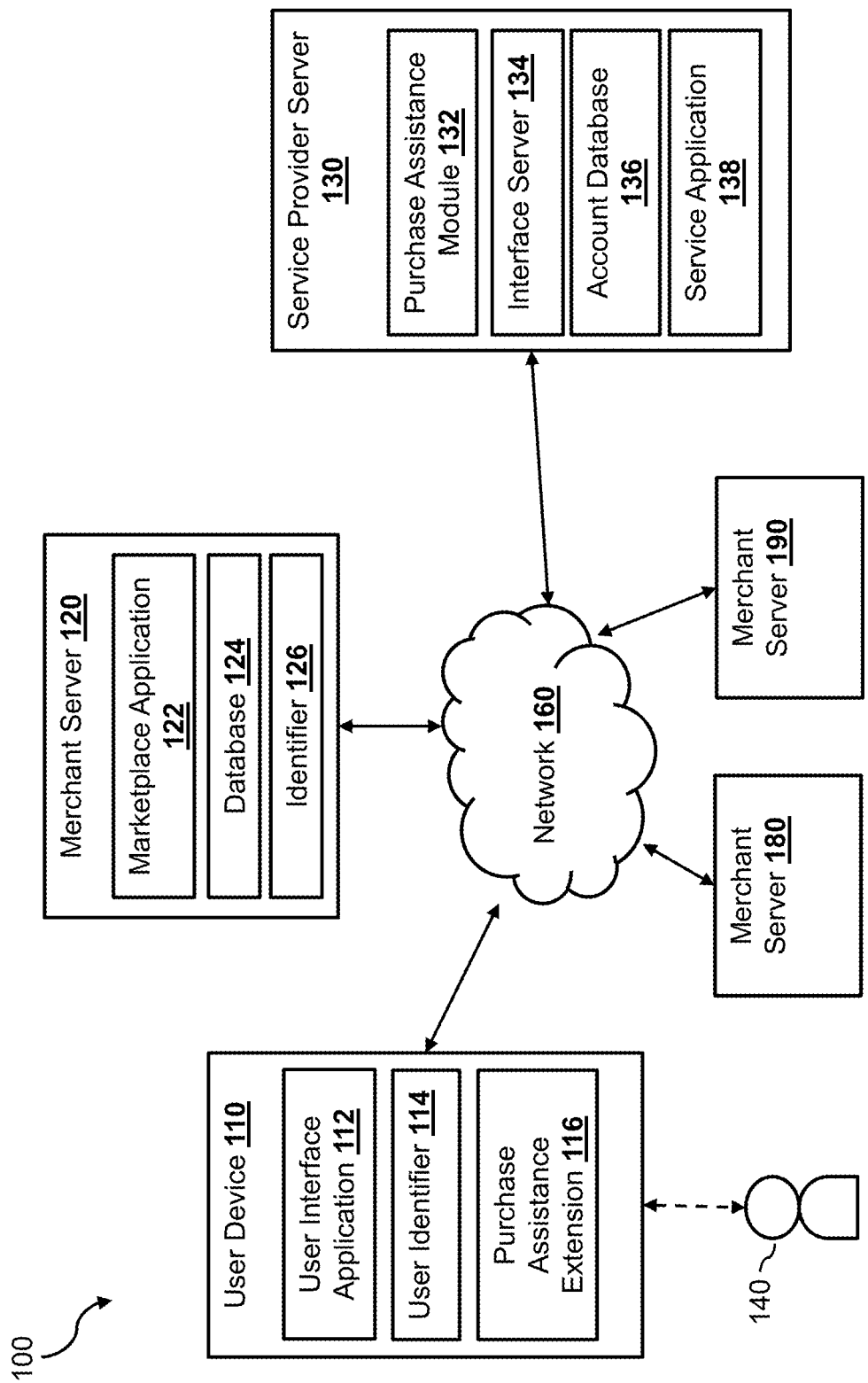
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for detecting and verifying content associated with a webpage. As discussed herein, extracting content from third-party webpages can be useful for a service provider to provide services for users. Such services provided by the service provider may be additional to what the third-party webpages can provide. For example, as a user is browsing a merchant webpage within a merchant website that displays a particular product (which can include, but is not limited to, physical goods, digital goods, services, and content), a purchase assistance system (that is not associated with the merchant website) may detect the particular product and a price indicated on the webpage, and may provide additional content for the user, such as additional information associated with the product not presented on the webpage, user reviews of the product presented on other webpages, a price trend of the product over a period of time, prices of the product offered by other merchants, etc. The additional content may be provided on the webpage for the user (e.g., overlaid on the webpage), such that the user may view the additional content alongside the webpage.

However, in order to provide accurate additional content for the user in real-time as the user is browsing the webpage (e.g., before the user browses another webpage), the purchase assistance system needs to accurately and quickly identify the product presented on the webpage and a currency used for presenting a price on the webpage. For example, the purchase assistance system may initially extract data (e.g., text data, image data, etc.) from the webpage, and determine a price and a product based on the extracted data. The purchase assistance system may extract the data based on scraping the webpage, such as parsing and analyzing the source code (e.g., HTML code, JavaScript code, etc.) associated with the webpage, parsing and analyzing a uniform resource locator (URL) associated with the webpage, downloading and analyzing multi-media content (e.g., one or more images, one or more videos, one or more audio clips, etc.) included in the webpage, etc.

The extracted data may include a URL of the webpage (e.g., "https://www.macys.com/shop/product/new-balance/little_boys"), descriptions of a product, such as a title (e.g., "Little Boys Playgroup Slip-On Running Sneakers from Finisl") and detailed description of the product (e.g., "great comfortable running shoes for little boys"), a price (e.g., "$45.00"), an image of the product, and other information. In some embodiments, the purchase assistance system may be configured to match the product to a product record of a product catalog such that the product presented on the webpage can be effectively compared against the same product found in other webpages. The product record may also be used to determine a currency associated with the price, in order to provide the services to the user in real-time. Both of these tasks can be challenging due to the limited information that can be directly extracted from the webpage itself. For example, different merchants may use different descriptions to describe the same product such that there is no universal description for identifying a particular product. Furthermore, the description of the product provided on the webpage may include incomplete, incorrect, and/or fragmented product description. The merchant may intentionally omit and/or slightly modify the model number of the product to prevent third-party service providers such as the purchase assistance system from providing the services (e.g., shopping assistance services) to the user while the user is browsing the webpage.

In some cases, a product may include multiple configurations (e.g., different colors, different styles, etc.) that may be mapped to different product records in the product catalog and that are associated with different prices. For example, a particular shoe model may include a limited edition version (e.g., in a special color, etc.) that may cost more than a regular edition version. Thus, instead of indicating a particular price, the webpage may not display a price or may display a price range (e.g., "$45.00-$70.00). The webpage may also include selectable elements (e.g., selection boxes, etc.) that enable the user to configure the product, and may update the price on the webpage based on the selections of the user without redirecting the user to another webpage.

The currency associated with the price presented on the webpage can also be challenging to verify, since many currency symbols are shared by different currencies. For example, the dollar symbol ("$") can refer to U.S. Dollars, Canadian Dollars, Australian Dollars, Argentina Pesos, Hong Kong Dollars, etc. The pound symbol ("£") can refer to British Pound, Gibraltar Pound, Guernsey Pound, etc. In some embodiments, the purchase assistance system may use the location information associated with a user device used by the user to view the webpage and/or a language chosen to present the webpage to predict the currency used in the price of the product. However, using location information of the user device and/or language to predict the currency does not always produce the correct result. One reason is the prevalent use of virtual private networks (VPNs) that may cause an inaccurate determination of the actual location of the user device that presents the webpage, when the webpage is accessed by the user device through another server located in a different country via a VPN configuration. Another reason is that certain merchant websites may be configurable (e.g., by the user) to present prices in a currency different from the currency used locally at a location associated with the user device accessing the merchant websites. For example, a U.S. citizen, while shopping online in Canada during her visit to Canada, may configure the merchant website to present U.S. Dollars instead of Canadian Dollars, as she may feel more comfortable comparing prices and paying in U.S. Dollars instead of Canadian Dollars.

As such, according to various embodiment of the disclosure, the purchase assistance system may detect a product and a currency used for presenting a price of the product on a webpage based on data directly extracted from the webpage, data associated with other webpages, and using a remote device different from the user device to access and interact with the webpage. In some embodiments, the purchase assistance system may include a client module (also referred to as a "purchase assistance extension") that can be installed on and executed by user devices of users. The purchase assistance extension may be a software application implemented as a plug-in or an extension to the web browsers of the user devices, such that the purchase assistance extension may provide additional functionalities and services to the user via the web browsers.

For example, the purchase assistance extension that is installed as a plug in or an extension to a web browser of a user device may monitor webpages accessed by the web browser. The user may use the web browser to browse various webpages, such as merchant webpages associated with different merchants. A merchant webpage may present one or more products offered for sale. When the purchase assistance extension (which can be a plug-in or an extension to the web browser that accesses the webpage) detects a merchant webpage being accessed by the web browser, the purchase assistance extension may perform the purchase assistance functionalities as discussed herein and provide additional services to the user via the web browser. In some embodiments, the purchase assistance extension may detect that a merchant webpage is being accessed by the web browser based on a price (e.g., a currency symbol) being displayed on the webpage accessed by the web browser.

In some embodiments, the purchase assistance extension may identify a product being presented on the merchant webpage and a price of the product offered by a merchant associated with the merchant webpage. Based on the product and/or the price presented on the webpage, the purchase assistance extension may present, on the web browser, relevant content for the user. In some embodiments, the purchase assistance extension may present, on the web browser, a price history of the product over a time period (e.g., the past 6 months, the past year, etc.). In some embodiments, the purchase assistance extension may present, on the web browser, prices of the product offered by other merchants (e.g., via other merchant webpages). The purchase assistance may also present links to the other webpages associated with the other merchants such that the user can easily purchase the product having the lowest price.

In order for the purchase assistance system to provide such services to the users, the purchase assistance system needs to accurately identify the product that is being presented on the merchant webpage such that the purchase assistance system may match the product being presented on the merchant webpage with products offered by other merchants. The purchase assistance system also needs to accurately determine a currency used for the price presented on the merchant webpage such that the purchase assistance system may access relevant price data associated with the product from various merchants, and present the relevant price data on the web browser. Furthermore, the purchase assistance system is required to accurately detect the product and currency in real-time (e.g., within a substantially small amount of time, such as less than a second, from the time that the webpage is being accessed by the web browser), such that the additional information can be presented on the web browser when the webpage is being presented on the web browser (e.g., before the user accesses another webpage on the web browser).

As discussed herein, it is a challenge to accurately and efficiently detect product and currency information from a webpage. In some embodiments, upon detecting a merchant webpage accessed by a web browser, the purchase assistance extension may scrape the webpage using the techniques disclosed herein. For example, the purchase assistance extension may parse and analyze the source code (e.g., HTML, code, JavaScript code, etc.) associated with the webpage. Based on the source code associated with the webpage, the purchase assistance extension may extract text data associated with a product presented on the webpage, such as a title of the product, a model number of the product, a detailed description of the product, and a price of the product. The purchase assistance extension may also parse and analyze a uniform resource locator (URL) associated with the webpage. Based on the URL associated with the webpage, the purchase assistance extension may extract data such as a title of the webpage, which may be related to the product. Certain merchant websites may provide different content (e.g., different merchant webpages, etc.) based on a geographical region (e.g., a location of the user device used to access the website). For these merchant websites, each merchant webpage may be specific to a particular local region. In other words, different locale-specific webpages may be accessed using different URLs for different regions. Thus, the purchase assistance extension may extract locality information based on parsing the URL associated with the webpage. The purchase assistance extension may also download and analyze multi-media content (e.g., one or more images, one or more videos, one or more audio clips, etc.) included in the webpage.

The purchase assistance system may determine whether a product can be identified based on the data from the source code, the URL, and the multi-media content associated with the webpage. In some embodiments, the purchase assistance system may also include a purchase assistance server that is in communication with different purchase assistance extension instances installed in different user devices. The purchase assistance server may generate or otherwise obtain a product catalog that includes data associated with different products offered by sale by different merchants. In some embodiments, the product catalog may be implemented as a database that includes multiple data records, where each record corresponds to a particular product. Thus, each record may include, for a corresponding product, information associated with a manufacturer of the product, a model (e.g., a model number) of the product, a particular configuration of the product (e.g., a color, a version, etc.), a category of the product, a sub-category of the product, one or more URLs that offer the product for sale, one or more keywords that describe the product, and pricing information associated with different merchants that offer the product for sale. Since a product model may include multiple variations (e.g., different versions) that may be associated with different prices, the product catalog may include multiple records for a product model, each record corresponds to a different version of the product model.

As such, the purchase assistance extension may transmit the data extracted from the webpage to the purchase assistance server for matching the product presented in the webpage with one or more records in the product catalog. In some embodiments, the purchase assistance server and/or the purchase assistance extension may create a data structure for matching the product with the record(s) in the product catalog, and may populate the data structure based on the data extracted from the webpage. The data structure may include multiple key-value pairs corresponding to different attributes of the product. For example, the data structure may include a store identifier data field corresponding to an identity of the merchant associated with the webpage, a title of the webpage, a URL of the webpage, a price of the product indicated on the webpage, other information associated with the website. In some embodiments, the purchase assistance extension may populate the data structure as data is being extracted from the webpage, and may transmit the populated data structure to the purchase assistance server.

In some embodiments, the purchase assistance server may determine whether the product corresponds to one or more records in the product catalog based on the data included in the data structure. For example, the purchase assistance server may match words in the title of the webpage with various attributes in the data catalog, such as the manufacturer attribute, the model attribute, the category attribute, the sub-category attribute, etc. In some embodiments, the purchase assistance server may calculate a confidence score (e.g., on a scale of 0-100 where 0 represents no match at all and 100 represents a complete match) based on how close the data in the data structure matches the attribute values in the data record. The closer they match, the higher the confidence score is calculated by the purchase assistance server. The purchase assistance server may determine that the product corresponds to a product record with the confidence score calculated for the product record exceeds a predetermined threshold.

In some embodiments, the purchase assistance server may determine that multiple product records in the product catalog correspond to the product. For example, when the merchant webpage includes incomplete information associated with the product, the purchase assistance server may identify multiple product records (not be able to identify a single product record) that potentially match the product presented on the webpage. In another example, the merchant webpage may include multiple versions of products that correspond to the same product model (e.g., different colors, different versions such as a special edition, a limited edition, and a regular version, etc.). The merchant webpage may enable the user to select, within the webpage, a particular version for purchase without being redirected to another merchant webpage.

When the purchase assistance server determines that the product presented on the webpage matches multiple product records, the purchase assistance server may perform additional actions to identify a single product record within the product catalog for the merchant webpage (or for a version of the merchant webpage). For example, the purchase assistance server may independently (separately from the user device) access the merchant webpage based on the URL using a browser application of the purchase assistance server, and may interact with the merchant webpage via the browser application to obtain additional data associated with the merchant webpage. The interactions may include selecting one or more interactive elements (e.g., a button, a scroll bar, a selection box element, etc.) presented on the merchant webpage. Since the merchant webpage may change its appearance and/or content based on the interactions, the purchase assistance server may iteratively select each one of the interactive elements, and analyze the content on a new version of the webpage. After selecting a first interactive element on the webpage, the purchase assistance server may extract the data from the version of the webpage. Since the content of the webpage may change in response to the selection of the first interactive element, the extracted data may include additional data.

In one particular example, the merchant webpage may correspond to different versions of a product model, which may include a limited edition version associated with a higher price than a regular edition version of the same product model. As such, the merchant webpage (before selecting any interactive elements) may present incomplete product description (without specifying any one particular version), or present descriptions associated with multiple versions of the same product model. Furthermore, the merchant webpage may also be configured to display a price range (instead of one specific price) based on the different prices associated with the different versions of the product model. Based on analyzing the data extracted from the webpage, the purchase assistance server may determine that the merchant webpage matches two different product records in the product catalog—a first product record corresponding to the limited edition version of the product model and a second product record corresponding to the regular edition version of the product model. By selecting a selectable element corresponding to the limited edition version of the product model, the merchant webpage may be transformed to a new version of the webpage and may display data associated with only the limited edition version of the product model (e.g., a product title that corresponds to the limited edition version and a price that corresponds to the limited edition version). Based on the additional (or updated) data from the modified webpage, the purchase assistance server may identify one particular product record in the product catalog (e.g., the product record that corresponds to the limited edition version of the product model) for the particular version of the webpage.

The purchase assistance server may repeat the same process by selecting another interactive element (e.g., a second interactive element) on the webpage, and identify another product record for another version of the webpage. The purchase assistance server may iteratively select different interactive elements on the webpage and identify particular product records in the product catalog for each different version of the webpage. This way, the purchase assistance system may provide accurate information to the user based on a particular selection of the user on the webpage.

Certain merchant website may provide customized content to users based on locations of the users. For example, certain product models or certain versions of a product model may be available for sale only for a specific geographic region (e.g., a limited edition version of the product model for a particular country, etc.). Since the purchase assistance server may not be located in the same geographical area as the user device used by the user to access the merchant website, in some embodiments, instead of using the browser application of the purchase assistance server to access and interact with the merchant webpage, the purchase assistance server may use a remote server that is located within the same geographical area of the user device to access and interact with the merchant webpage. Thus, in some embodiments, the purchase assistance server may be communicatively coupled with one or more remote servers deployed at one or more different geographical areas (e.g., different states, different countries, different continents, etc.) for accessing merchant webpages based on different geographical regions. In some embodiments, the purchase assistance server may select, from the different remote servers deployed at the different geographical areas, a particular remote server for accessing the merchant webpage based on a location of the user device, such that the webpage accessed by the particular remote server would be identical to the webpage accessed by the user device. The purchase assistance server may cause the particular remote server to access and interact with the webpage using the same techniques disclosed herein. The purchase assistance server may analyze the different versions of the webpage based on different selections of the interactive elements and identify product records for the different versions of the webpage.

Once a single product record is identified for the webpage (or a version of the webpage) being presented on the user device, the purchase assistance extension may modify a presentation of the webpage based on the data within the identified product record. As discussed herein, the product record may include information such as a price trend of the product, other merchants that offer the same product, and prices offered by the other merchant for the product. In some embodiments, the purchase assistance extension may generate a user interface that is overlaid (superimposed) on the webpage presented on the web browser. The user interface may include one or more of the information, such as the price trend of the product, other merchants that offer the same product, and prices offered by the other merchant for the product.

However, as discussed herein, in order for the purchase assistance system to present relevant price comparison information to the user, the purchase assistance system is required to accurately determine the currency used for the price presented on the webpage, such that a price trend and competitive offers by other merchants can be analyzed and presented in the correct currency. As such, in another aspect of the disclosure, the purchase assistance system is configured to determine a currency of the price presented on the webpage based on data extracted from the webpage, attributes of the user device used to access the webpage, and information included in a product record determined to match the webpage.

In some embodiments, as the purchase assistance extension scrapes the webpage, the purchase assistance extension may determine a price for the product presented on the webpage. The price may include a currency symbol and a value (e.g., "$45.00"). The price, along with other data extracted from the webpage (in the form of a data structure), may be transmitted from the purchase assistance extension to the purchase assistance server. Upon receiving the price, the purchase assistance server may try to determine a currency based on the currency symbol alone. However, as discussed herein, it may not be possible to accurately determine the currency used to present the price on the webpage based on the currency symbol alone, as the currency symbol may be shared among different currencies. As such, if the purchase assistance server determines that the currency symbol is used by multiple currencies, the purchase assistance server may use the product record determined for the webpage to determine (and/or verify) a currency used by the webpage.

In some embodiments, the product record determined for the webpage includes prices of the corresponding product offered by various merchants at different geographical locations. As such, the prices obtained by the purchase assistance server and stored in the product record may include prices in different currencies. In some embodiment, the prices stored in the product record may be grouped based on their corresponding currencies, such that prices in the same currency would be compiled in the same group. Since the currency symbol included in the price of the product presented on the website may correspond to multiple different currencies, the purchase assistance server may retrieve multiple groups of prices from the product record that corresponds to the multiple different currencies. In some embodiments, the purchase assistance server may compare the price of the product presented on the website against the prices of each group stored in the product record. Since the price of the product should be similar (e.g., within a threshold) to the group of prices corresponding to the same currency, the purchase assistance server may determine, from the different groups of prices, a particular group having prices that are closest to the price of the product. In some embodiments, the purchase assistance server may determine, for each currency, a price trend based on the historic prices within each group. The purchase assistance server may determine a currency for the webpage based on how close the price of the product tracks each of the price trends determined for the different currencies. The purchase assistance server may determine, for the webpage, a particular currency corresponding to a price trend that closely tracks the price of the product presented on the webpage.

In some embodiments, in order to verify the currency associated with the webpage, the purchase assistance server may use a remote server (that is determined to be in the same geographical region as the user device used by the user to access the webpage) to access the webpage. The purchase assistance server may determine whether the price presented on the webpage accessed by the remote server is the same as the price presented on the webpage accessed by the user device. If they are the same, the purchase assistance server may use the location information of the user device and/or the remote server to further verify the currency used to present the price of the product.

Once the currency is verified, the purchase assistance server may generate the additional content for presenting on the user device based on the product record. For example, the purchase assistance may generate a price trend based on the corresponding group of prices corresponding to the currency, and prices of the product offered by other merchants in the same currency. The purchase assistance server may transmit the additional content to the purchase assistance extension. The purchase assistance extension may generate the user interface based on the additional content, and may modify the webpage based on the additional content.

FIG. 1 illustrates an electronic transaction system 100, within which the purchase assistance system may be implemented according to one embodiment of the disclosure. The electronic transaction system 100 includes a service provider server 130, merchant servers 120, 180, and 190, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with any one of the merchant servers 120, 180, and 190, and/or the service provider server 130 over the network 160. For example, the user 140 may use the device 110 to conduct an online purchase transaction with the merchant server 120 via websites hosted by, or mobile applications associated with, the merchant server 120 respectively. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface application 112 (e.g., a web browser, a mobile payment application, etc.), which may be utilized by the user 140 to conduct electronic transactions (e.g., online payment transactions, etc.) with any one of the merchant servers 120, 180, and 190, and/or the service provider server 130 over the network 160. In one aspect, purchase expenses may be directly and/or automatically debited from an account related to the user 140 via the user interface application 112.

In one implementation, the user interface application 112 includes a software program (e.g., a mobile application) that provides a graphical user interface (GUI) for the user 140 to interface and communicate with the service provider server 130 and/or any one of the merchant servers 120, 180, and 190 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include a purchase assistance extension 116 that implements the client module (also referred to as the purchase assistance extension) as disclosed herein. In some embodiments, the purchase assistance extension 116 may be an extension or an add-on to the user interface application 112, and may provide additional purchase assistance functionalities for the user interface application 112, as disclosed herein. For example, the purchase assistance extension 116 may work with the purchase assistance module 132 of the service provider server 130 to provide enhanced content for the user 140 based on a user interface page (e.g., a webpage) that is being accessed by the user interface application 112.

The user device 110, in one embodiment, may include at least one user identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile) maintained by the service provider server 130.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user 140.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods or services in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. In one example, the marketplace application 122 may include an interface server (e.g., a web server, a mobile application server, etc.) that provides an interface (e.g., a webpage) for the user 140 to interact with the merchant server 120. The merchant web site hosted by the merchant server 120 may include a home webpage, many different product webpages related to different products, which may include webpage elements (e.g., links, selectable elements, etc.) for further configuring the product presented on the webpage and for initiating payment services with the service provider server 130 and possibly other service providers.

Each of the merchant servers 180 and 190 may be associated with a different business entity (e.g., a different merchant site, etc.), and may include similar components as the merchant server 120. As such, each of the merchant servers 180 and 190 may offer products and/or services for sale via a respective user interface (e.g., a respective website, etc.). The user 140 may, via the user interface application 112 of the user device 110, browse through different product pages of the merchant servers 120, 180, and 190, and may initiate a purchase transaction for purchasing any one or more products from the merchant servers 120, 180, and 190.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant servers 120, 180, and 190 over the network 160 to facilitate the searching, selection, purchase, payment of items, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user may access a user account associated with the user and access various services offered by the service provider server 130, by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes a purchase assistance module 132 that implements part of the purchase assistance system as discussed herein. The purchase assistance module 132 is configured to provide purchase assistance functionalities to various user devices (e.g., the user device 110) based on communications with the purchase assistance extensions (e.g., the purchase assistance extension 116) installed on the various user devices. In some embodiments, the purchase assistance module 132 may collaborate with the purchase assistance extension 116 to identify a product presented on a webpage accessed by the user interface application 112, and a currency used to present a price on the webpage. Based on the identified product and currency used, the purchase assistance module 132 may generate enhanced content for display via the user interface application 112.

Figure 2:
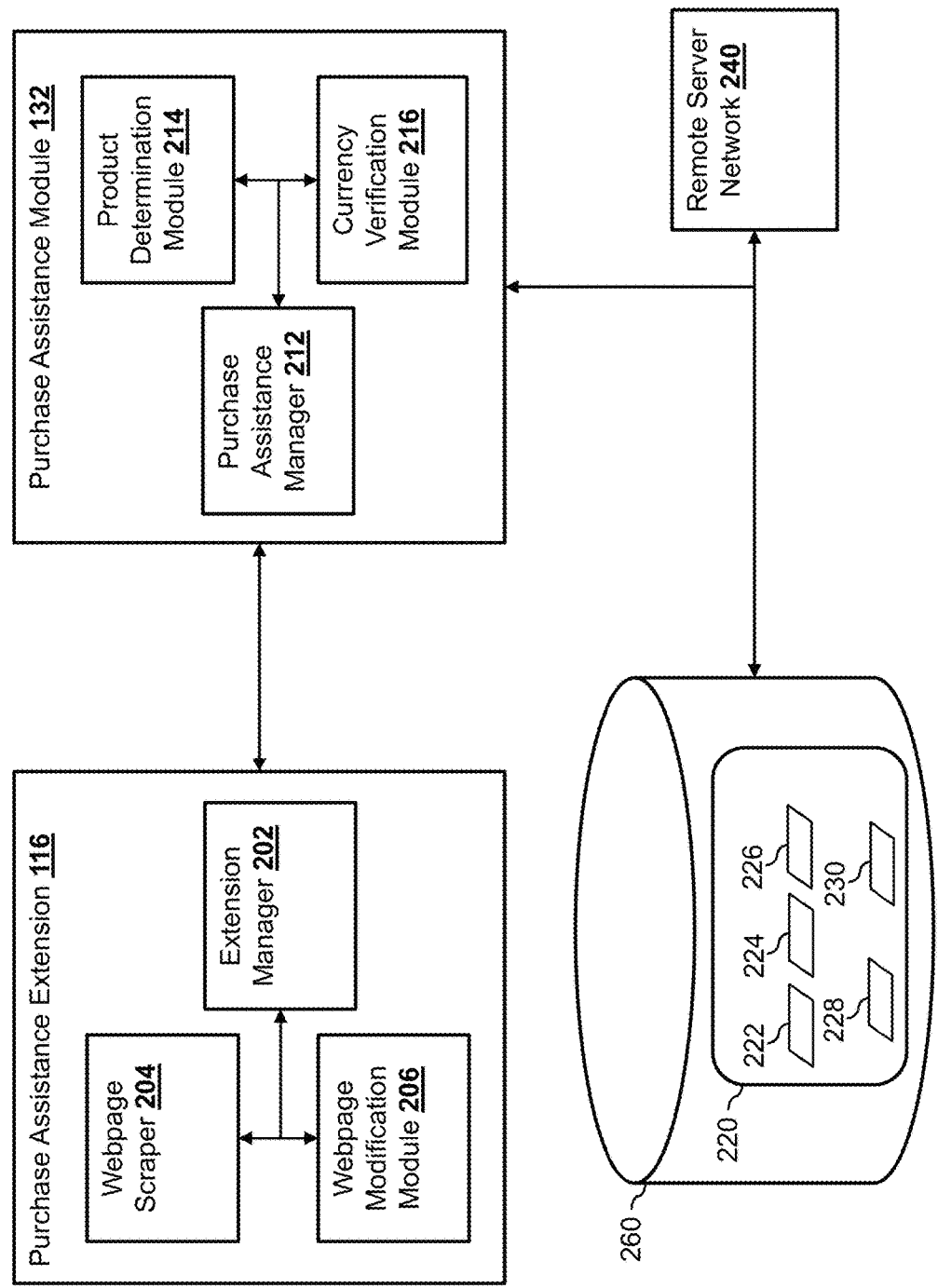
FIG. 2 is a block diagram illustrating a purchase assistance system according to an embodiment of the present disclosure.

FIG. 2 illustrates a block diagram of a purchase assistance system 200 according to an embodiment of the disclosure. The purchase assistance system 200 includes the purchase assistance extension 116 that may be implemented within the user device 110, the purchase assistance module 132 that may be implemented within the service provider server 130, a remote server network 240 that includes one or more remote servers, and a data storage 260. In some embodiments, the purchase assistance extension 116 may include an extension manager 202, a webpage scraper 204, and a webpage modification module 206. The purchase assistance module 132 may include a purchase assistance manager 212, a product determination module 214, and a currency verification module 216.

As discussed herein, the purchase assistance extension 116 of some embodiments may be implemented as a plug-in or an extension to a web browser application (e.g., the user interface application 112). As such, when the purchase assistance extension 116 is installed on a user device (e.g., the user device 110), the purchase assistance extension 116 may be linked to a corresponding web browser application installed on the user device (e.g., the user interface application 112). Additional purchase assistance extensions that are similar to the purchase assistance extension 116 may be installed on other user devices and linked to the corresponding web browser applications in the other user devices to perform similar purchase assistance functionalities as the purchase assistance extension 116, as disclosed herein. By linking the purchase assistance extension 116 to the user interface application 112, the purchase assistance extension 116 may be integrated within the user interface application 112, which enables the user interface application 112 to perform additional functionalities that were not available to the user interface application 112 prior to the integration. For example, the purchase assistance extension 116 may receive user inputs from the user 140 via a user interface (e.g., a webpage, other user interface elements of the user interface application 112, etc.) of the user interface application 112, and my present additional content on the user interface of the user interface application 112 (e.g., through an application programming interface (API) of the user interface application 112).

In some embodiments, the extension manager 202 of the purchase assistance extension 116 may be configured to monitor webpages being accessed by the user interface application 112. Since the purchase assistance extension 116 is integrated within the user interface application 112, the extension manager 202 may determine a webpage being accessed by the user interface application 112 by detecting a transmission of an HTTP request by the user interface application 112 and/or a receipt of data, such as a HTML, file, associated with a webpage by the user interface application 112.

Upon determining that the webpage is being accessed by the user interface application 112, the extension manager 202 may determine whether the webpage is a product webpage—that is, a webpage for presenting a particular product or service. In some embodiments, the extension manager 202 may determine whether the webpage is a product webpage based on the uniform resource locator (URL) associated with the webpage, a title of the webpage, a layout of the webpage, and presentable content on the webpage (e.g., whether the presentable content includes a price associated with a product or a service, etc.). For example, attributes of the webpage (e.g., the URL, the title, elements of the layout and content of the webpage, etc.) may be provided to a machine learning model to determine a likelihood that the webpage is a product webpage. The extension manager 202 may determine that the webpage is a product webpage when the likelihood determined by the machine learning model is above a threshold (e.g., more than 70%, etc.).

When the extension manager 202 determines that the webpage is a product webpage, the purchase assistance extension 116 may collaborate with the purchase assistance module 132 to generate additional content for the webpage and may use the webpage modification module 206 to modify the webpage based on the additional content. The additional content may include additional information associated with the product, a historic price trend of the product (e.g., prices of the product that have been offered by one or more merchants, etc.), and links to webpages of other merchants that offer the same product for sale, and other information. However, in order to generate relevant additional content for the webpage, the purchase assistance system 200 needs to determine accurate information associated with the product being presented on the webpage, which may include an identity of the product and a currency used for presenting a price of the product on the webpage.

As such, the purchase assistance extension 116 of some embodiments may work with the purchase assistance module 132 to determine the identity of the product and the currency used for presenting the price of the product on the webpage. In some embodiments, the purchase assistance module 132 may include or have access to a product catalog 220 (e.g., stored in a data storage 260 accessibly by the purchase assistance module 132). The product catalog 220 may include multiple product records, such as product records 222, 224, 226, 228, and 230, for storing data associated with different distinct products. In some embodiments, each distinct product may correspond to a different product record in the product catalog 220. For a product model that includes different configurations (e.g., different colors, different styles, etc.), each configuration of the product model may correspond to a different product record. For example, a regular edition of the Converse® Classic Chuck may correspond to one product record while a limited edition of the same Converse® Classic Chuck model may correspond to another product record. Since the limited edition may have different attributes such as a different price from the regular edition, having different product records for the different versions (or configurations) further enables the purchase assistance system 200 to provide accurate additional content for the users.

Each product record in the product catalog 220 may include information associated with the corresponding product, such as a brand name, a product category, a model name, a model number, one or more images (or image characteristics) of the product, keywords associated with the description of the product, one or more URLs of webpages of merchants that offer the product for sale and the corresponding prices. Since the products may be offered for sale by different merchants and in different countries, each product record may include multiple prices obtained at different times and in different currencies. In some embodiments, the purchase assistance module 132 may generate the product records of the product catalog 220 by accessing (and/or causing the remote servers in the remote server network 240 to access) different product webpages (e.g., webpages that present and offer products for sale), and collecting data from the different product webpages. The purchase assistance module 132 may access the different product webpages multiple times over a period of time (e.g., once a month, etc.) to obtain prices of the products at different times such that the purchase assistance module 132 can derive price histories and price trends of the different products (e.g., how the prices change over time for the products, etc.).

In some embodiments, to identify the product being presented on the webpage, the purchase assistance extension 116 may work with the purchase assistance module 132 to determine a particular product record in the product catalog 220 that corresponds to the product presented on the webpage based on data extracted from the webpage. For example, the purchase assistance extension 116 may obtain information about the product from the webpage and may determine a product record in the product catalog 220 based on the information. In some embodiments, the extension manager 202 may use the webpage scraper 204 to scrape the webpage. Scraping the webpage may include parsing and analyzing the URL associated with the webpage. Since the URL of the webpage may include text data related to the product being presented on the webpage, analyzing the URL may enable the purchase assistance extension 116 to obtain information that may help in identifying the product being presented on the webpage. For a webpage having a URL of "https://www.macys.com/shop/product/new-balance/little-_boys", the webpage scraper 204 may first identify the main domain of a website associated with the webpage (e.g., "macys.com") and common words and characters such as "https://," "shop," "/," and "product." After eliminating the identified characters and words, the URL may include words such as "new-balance" and "little_boys." Based on these words, the webpage scraper 204 may determine that the product being presented on the webpage may be associated with a brand "New Balance" and a product specifically for young boys. Since the brand "New Balance" is a brand for athletic shoes, the webpage scraper 204 may further induce that the product is related to young boys' athletic shoes.

In some embodiments, scraping the webpage may also include parsing and analyzing the source code associated with the webpage. As discussed herein, the extension manager 202 may, via the user interface application 112, receive a source file (e.g., an HTML, file) associated with the webpage from a server (e.g., one of the merchant servers 120, 180, and 190). The source file includes computer programming code (e.g., interpretable code such as HTML code that may indicate text, image, and other multi-media data for presenting on the webpage, styling configuration code such as CSS for specifying styling of the presentable elements on the webpage, executable code such as JavaScript code for performing computer logic, etc.), that when executed by the user interface application 112, renders a presentable webpage for presenting on the user device 110. As such, by parsing and analyzing the source file, the webpage scraper 204 may determine different presentable and non-presentable elements on the webpage. The presentable elements may include text data, such as a displayed title of the webpage, a description of the product being presented on the webpage, a price of the product, an image of the product, and other information. For example, the title of the webpage may be "Little Boys Playgroup Slip-On Running Sneakers from Finisl" which provides additional information about the product than what was determined based on the URL. The non-presentable webpage may include comments and other text that are not presentable on the webpage, and programming logic (e.g., implemented in a scripting language such as JavaScript, etc.) for rendering different versions of the webpage based on different interactions between the user and the webpage.

The extension manager 202 may transmit the data obtained from scraping the webpage to the purchase assistance module 132. In some embodiments, the extension manager 202 may create a data structure having a predetermined data format for the product. The data structure may include one or more pre-defined fields such as a merchant identifier, a title of the webpage, a price, a URL, and other fields. As the purchase assistance extension 116 obtain information from scraping the webpage, the purchase assistance extension 116 may populate the fields in the data structure with data associated with the product. The purchase assistance extension 116 may then transmit the populated data structure to the purchase assistance module 132.

In some embodiments, the product determination module 214 of the purchase assistance module 132 may attempt to determine a particular product record in the product catalog 220 based on the data within the data structure. For example, by using the URL, the title of the webpage, and the product description, the product determination module 214 may identify a particular product record in the product catalog 220 that matches the product. However, as discussed herein, the product determination module 214 may not be able to identify a single product record (e.g., may identify several possible matches based on the data received from the purchase assistance extension 116) due to many reasons. For example, the merchant may provide incomplete and/or fragmented product description provided on the webpage (e.g., the merchant intentionally or inadvertently omitting and/or modifying the model name and/or model number of the product on the webpage, etc.). In another example, the webpage may present a product model that includes multiple different configurations (e.g., a regular edition and a limited edition, different color configurations, etc.). The webpage may include different user selectable elements that enable a user (e.g., the user 140) to configure the product according to the different configurations. However, since the different configurations of the product model may correspond to different product records in the product catalog 220, based on the data that is scraped from the webpage by the webpage scraper 204 (which may include data associated with different configurations of the product model), the product determination module 214 may determine multiple product records, corresponding to the different configurations of the product model, for the product presented on the webpage.

In some embodiments, when the product determination module 214 determines that multiple product records are potential match for the product presented on the webpage, the purchase assistance module 132 may perform additional analysis on the webpage to identify a single product records from the multiple product records. In some embodiments, the purchase assistance manager 212 may access the webpage based on the URL of the webpage obtained from the purchase assistance extension 116 independently and separately from the user interface application 112. For example, the purchase assistance manager 212 may use a browser application of the service provider server 130 to access the webpage, such that the webpage is accessed by a web browser application different from the user interface application 112 of the user device 110. Upon accessing the webpage, the purchase assistance manager 212 may interact with the webpage via the browser application to obtain additional data associated with the webpage. The interactions may include selecting one or more interactive elements (e.g., a button, a scroll bar, a selection box element, etc.) presented on the webpage. As the purchase assistance manager 212 interacts with the webpage, the webpage may change its appearance and/or content, that is, a different version of the webpage may be presented on the user device 110 based on each interaction. Thus, in some embodiments, the purchase assistance module 132 may iteratively select each one of the interactive elements, and analyze the content presented on a new version of the webpage.

In one particular example, the webpage that offers both the limited edition and the regular edition of the product model for sale may include data (e.g., text descriptions, images, titles, etc.) corresponding to both editions of the product model. The webpage may include text and images associated with both of the regular edition and the limited edition of the production model, and may include prices (e.g., multiple prices, a price range, etc.) correspond to both of the regular edition and the limited edition of the product model. By analyzing the webpage, the purchase assistance manager 212 may determine that the webpage includes multiple interactive elements for selection, which may include a first interactive element for selecting the limited edition of the product model and a second interactive element for selecting the regular edition of the product model. Based on analyzing the data extracted from the webpage and without performing any interactions with the webpage, the product determination model 214 may determine two different product records in the product catalog 220 for the webpage—a first product record (e.g., the product record 222) corresponding to the limited edition of the product model and a second product record (e.g., the product record 224) corresponding to the regular edition of the product model.

Since multiple product records in the product catalog 220 are potential matches for the webpage, the purchase assistance manager 212 may begin interacting with the webpage via the web browser application. The purchase assistance manager 212 may initially select the first interactive element on the webpage. Based on the selection of the first interactive element, a new version of the webpage corresponding to the limited edition of the product model may be presented on the web browser application. The purchase assistance manager 212 may extract the data from this version of the webpage. Since the content of the webpage may change in response to the selection of the first interactive element, the extracted data may include additional data (or information) that is not available from the webpage before the selection. For example, the version of the webpage corresponds to the limited edition of the product model may include only description that corresponds to the limited edition of the product model and a price specifically for the limited edition of the product model (which may be higher than the price of the regular edition of the product model). Thus, based on analyzing the data associated with this version of the webpage, the product determination module 214 may determine a single product record (e.g., the product record 222) in the product catalog 220 for this version of the webpage.

The purchase assistance manager 212 may repeat the same process by selecting another interactive element (e.g., a second interactive element corresponding to the regular edition of the product model) on the webpage. The selection of the second interactive element corresponding to the regular edition of the product model may cause the webpage to display data associated with only the regular edition of the product model (e.g., a product title that corresponds to the regular edition version and a price that corresponds to the regular edition version) and not the limited edition of the product model. Based on the additional (or updated) data from the modified webpage, the product determination module 214 may identify one particular product record in the product catalog 220 (e.g., the product record 224 that corresponds to the regular edition version of the product model) for the particular version of the webpage. The purchase assistance manager 212 and the product determination module 214 may iteratively selecting different interactive elements on the webpage and identifying particular product records in the product catalog 220 for different versions of the webpage.

Certain merchant websites may provide customized content (e.g., customized webpages) to users based on locations of the users. For example, certain product models or certain versions of a product model may be available for sale only for a specific geographic region (e.g., a limited edition version of the product model may only be available for sale in a particular country, etc.). Since the server (e.g., the service provider server 130) in which the purchase assistance module 132 is implemented may not be located in the same geographical area as the user device 110 used by the user 140 to access the webpage, in some embodiments, the webpage that is accessed by the purchase assistance module 132 may be different from the one accessed by the user interface application 112 of the user device 110. To ensure that the purchase assistance module 132 is accessing the same webpage as the user device 110, the purchase assistance manager 212 may use a remote server that is located within the same geographical area of the user device 110 to access and interact with the webpage.

As shown in FIG. 2, the purchase assistance module 132 may be communicatively coupled to a remote server network 240, which may include various remote servers located in different geographical locations. In some embodiments, the purchase assistance manager 212 may select, from the different remote servers in the remote server network 240, a particular remote server for accessing the webpage based on a location of the user device 110. For example, the purchase assistance manager 212 may select the particular remote server based on the particular remote server being physically closest to the user device 110.

The purchase assistance manager 212 may cause the particular remote server to access and interact with the webpage using the same techniques disclosed herein. The purchase assistance manager 212 may obtain, from the particular remote server, data associated with the different versions of the webpage based on the particular remote server accessing and interacting with the webpage (e.g., selecting different selectable elements on the webpage, etc.). The product determination module 214 may analyze the different versions of the webpage based on different selections of the interactive elements and identify product records for the different versions of the webpage.

Once a product record in the product catalog 220 is identified for the webpage (or each of the different versions of the webpage) being presented on the user device, the purchase assistance system 200 may modify a presentation of the webpage on the user device 110 based on the data within the identified product record. As discussed herein, the product record may include information such as additional information associated with the product, a price trend of the product, other merchants that offer the same product, and prices offered by the other merchant for the product. In some embodiments, the purchase assistance manager 212 may generate the additional content for the webpage based on the data stored within the identified product record. For example, the purchase assistance manager 212 may compile the additional information associated with the product, the price trend of the product, and prices offered by other merchants for the product, and transmit the data to the purchase assistance extension 116. The webpage modification module 206 may generate a user interface for presenting the additional content received from the purchase assistance module 132 on the user device 110. The user interface may be overlaid (superimposed) on the webpage presented on the user interface application 112.

In some embodiments, when the webpage includes different versions corresponding to different products (and product records), the purchase assistance extension 116 may receive multiple sets of additional content corresponding to the different versions of the webpage. The webpage modification module 206 may monitor the webpage and may determine which version of the webpage is displayed on the user device 110. The webpage modification module 206 may then present a corresponding set of additional content when a particular version of webpage is detected to be displayed on the user device 110.

However, as discussed herein, to enable the purchase assistance system 200 to present accurate additional content (e.g., relevant price comparison information corresponding to the same currency as the currency used in the webpage, etc.) to the user, the purchase assistance system 200 may verify the currency used for the price presented on the webpage, such that a price trend and competitive offers by other merchants can be analyzed and presented in the correct currency. As such, in some embodiments, in addition to identifying the product presented on the webpage, the purchase assistance system 200 may verify a currency of the price presented on the webpage based on data extracted from the webpage, attributes of the user device used to access the webpage, and information included in the identified product record.

In some embodiments, as the webpage scraper 204 scrapes the webpage, the extension manager 202 may determine a price for the product presented on the webpage. The price may include a currency symbol and a value (e.g., "$45.00"). The price, along with other data extracted from the webpage (in the form of a data structure), may be transmitted from the purchase assistance extension 116 to the purchase assistance module 132. Upon receiving the price, the currency verification module 216 may try to determine a currency based on the currency symbol alone. However, as discussed herein, it may not be possible to accurately determine the currency used to present the price on the webpage based on the currency symbol alone, as the currency symbol may be shared among different currencies. As such, if the currency verification module 216 determines that the currency symbol is used by multiple currencies, the currency verification module 216 may use the product record identified for the webpage to determine (and/or verify) a currency used by the webpage.

As discussed herein, each product record in the product catalog 220 may include prices of the corresponding product offered by various merchants at different geographical locations. As such, the prices obtained by the purchase assistance module 132 and stored in the product records may include prices in different currencies. In some embodiment, the prices stored in each of the product records may be grouped based on their corresponding currencies, such that prices in the same currency would be compiled in the same group. Since the currency symbol included in the price of the product presented on the website may correspond to multiple different currencies, the currency verification module 216 may retrieve multiple groups of prices from the product record that corresponds to the multiple different currencies that are currency candidates for the webpage. In some embodiments, the currency verification module 216 may compare the price of the product presented on the website against the prices of each group stored in the product record. Since the price of the product should be similar (e.g., within a threshold) to the group of prices corresponding to the same currency, the currency verification module 216 may determine, from the different groups of prices, a particular group having prices that are closest to the price of the product.

In some embodiments, the currency verification module 216 may determine, for each currency, a price trend based on the historic prices within each group. The price trend may be generated by extrapolating historic price point data obtained by the purchase assistance module 132 at different times in the past. The currency verification module 216 may determine a currency for the webpage based on how close the price of the product tracks each of the price trends determined for the different currencies. The currency verification module 216 may determine, for the webpage, a particular currency corresponding to a price trend that closely tracks the price of the product presented on the webpage.

In some embodiments, in order to verify the currency associated with the webpage, the purchase assistance server may use a remote server (that is determined to be in the same geographical region as the user device used by the user to access the webpage) from the remote server network 240 to access the webpage. The currency verification module 216 may determine whether the price presented on the webpage accessed by the remote server is the same as the price presented on the webpage accessed by the user device 110. If they are the same, the currency verification module 216 may use the location information of the user device 110 and/or the remote server to further verify the currency used to present the price of the product (e.g., whether the currency is used in the location in which the user device 110 and/or the remote server is located).

Once the currency is verified, the purchase assistance manager 212 may generate the additional content for presenting on the user device 110 by including the group of prices from the product record that corresponds to the determined currency of the webpage. For example, if the currency determined by the currency verification module 216 is U.S. Dollars, the purchase assistance manager 212 may retrieve the group of prices from the product record that corresponds to U.S. Dollars, and may generate a price trend based on the retrieved group of prices in U.S. Dollars. The purchase assistance manager 212 may also include prices of the product currently offered by other merchants in U.S. Dollars. The purchase assistance manager 212 may transmit the additional content to the purchase assistance extension 116. The purchase assistance extension 116 may in turn incorporate the additional content in the user interface for presenting on the user device 110 using the techniques disclosed herein.

Figure 3A:
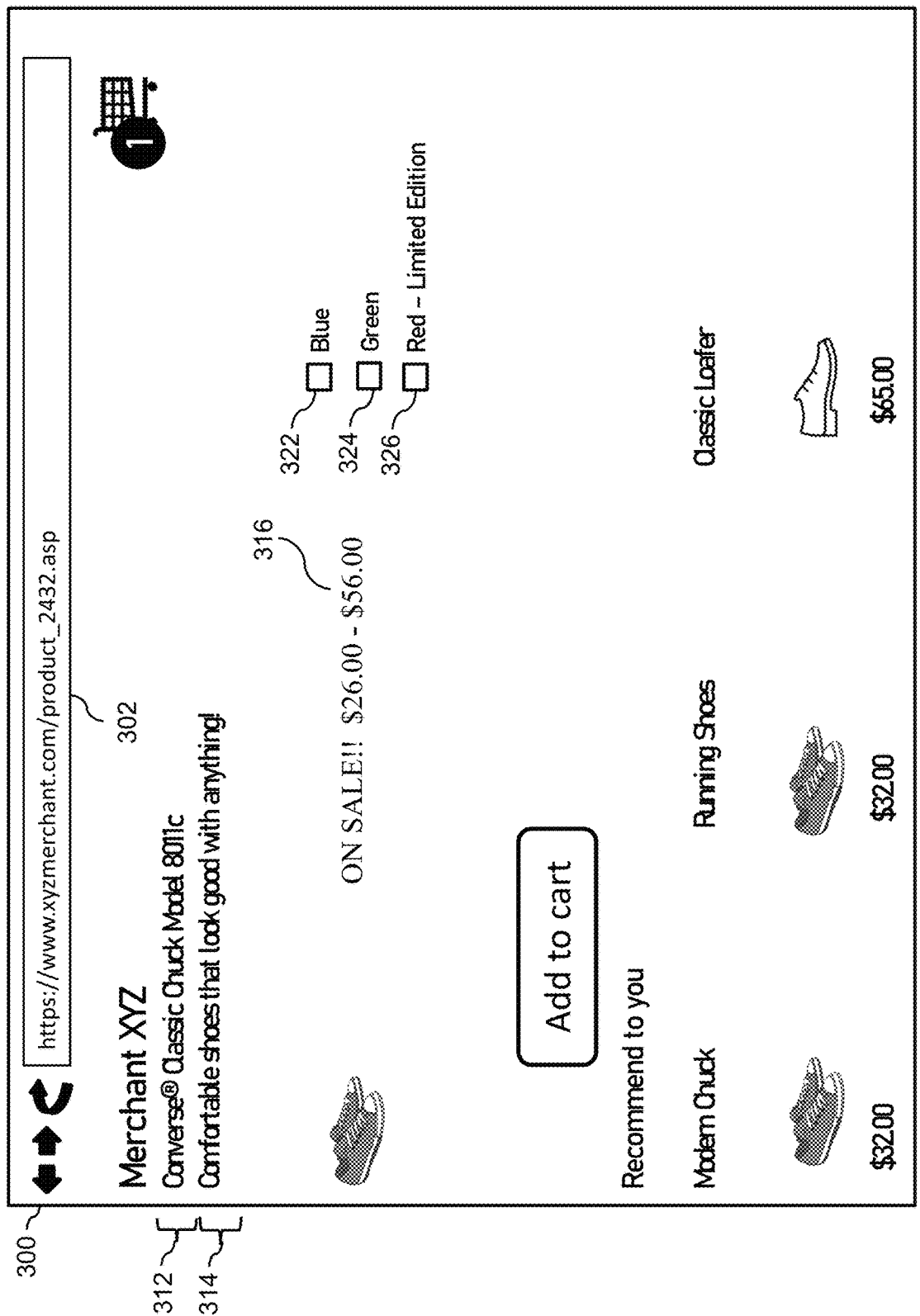
FIG. 3A illustrates an exemplary product webpage within a merchant website according to an embodiment of the present disclosure.

FIG. 3A illustrates an example product webpage 300 associated with a merchant website provided by a merchant server (e.g., any one of the merchant servers 120, 180, and 190, etc.). The product webpage 300 is associated with a uniform resource locator (URL) 302 "https://www.xyzmerchant.com/product_2432.asp". The product webpage 300 includes a title 312 that reads "Converse® Classic Chuck Model 8011c" and a product description 314 that reads "comfortable shoes that look good with anything." The webpage 300 also includes a price range 316 "$26.00-$56.00" for the products offered for sale on the webpage. In addition, the webpage 300 also includes selectable elements 322, 324, and 326, corresponding to different configurations of the Converse® Classic Chuck product model. For example, the selectable element 322 may correspond to a blue color configuration of the Converse, the selectable element 324 may correspond to a green color configuration of the Converse, and the selectable element 326 may correspond to a red color configuration (which is a limited edition) of the Converse. Each of the configuration of the product may correspond to a different price. Thus, when none of the selectable elements 322, 324, and 326 is selected, the webpage may only present a generic description of the product (e.g., "Converse® Classic Chuck Model 8011c") without specifying a color, and a price range (e.g., "$26.00-$56.00") instead of a specific price for a particular configuration of the product.

When the extension manager 202 detects that the webpage 300 is being accessed by the user interface application 112 of the user device 110, the webpage scraper 204 may obtain data associated with the webpage 300 by scraping the webpage 300. For example, the webpage scraper 204 may obtain the URL 302 of the webpage 300, the title 312 of the webpage 300, the product description 314 presented on the webpage 300, the price range 316 presented on the webpage, and the different selectable elements 322, 324, and 326 presented on the webpage. The extension manager 202 may populate a data structure with predefined data fields using the data extracted from the webpage 200, and may send the data structure to the purchase assistance module 132. Based on the data extracted from the webpage by the purchase assistance extension 116, the product determination module 214 may determine multiple product records that are possible matches for the webpage 300. The multiple product records may include product records corresponding to the product model "Converse® Classic Chuck" in different configurations.

Thus, the purchase assistance manager 212 may perform additional analysis to the webpage 300 in order to identify a single product record for the webpage or for each version of the webpage. In some embodiments, the purchase assistance manager 212 may use a web browser application (or cause a remote server located at a location corresponding to the user device 110) to access the webpage 300 and interact with the webpage 300. The purchase assistance manager 212 may iteratively select different selectable elements 322, 324, and 326 to cause different versions of the webpage to be presented, and extract data from the different versions of the webpage. For example, the purchase assistance manager 212 may select (or cause the remote server to select) the selectable element 322.

Figure 3B:
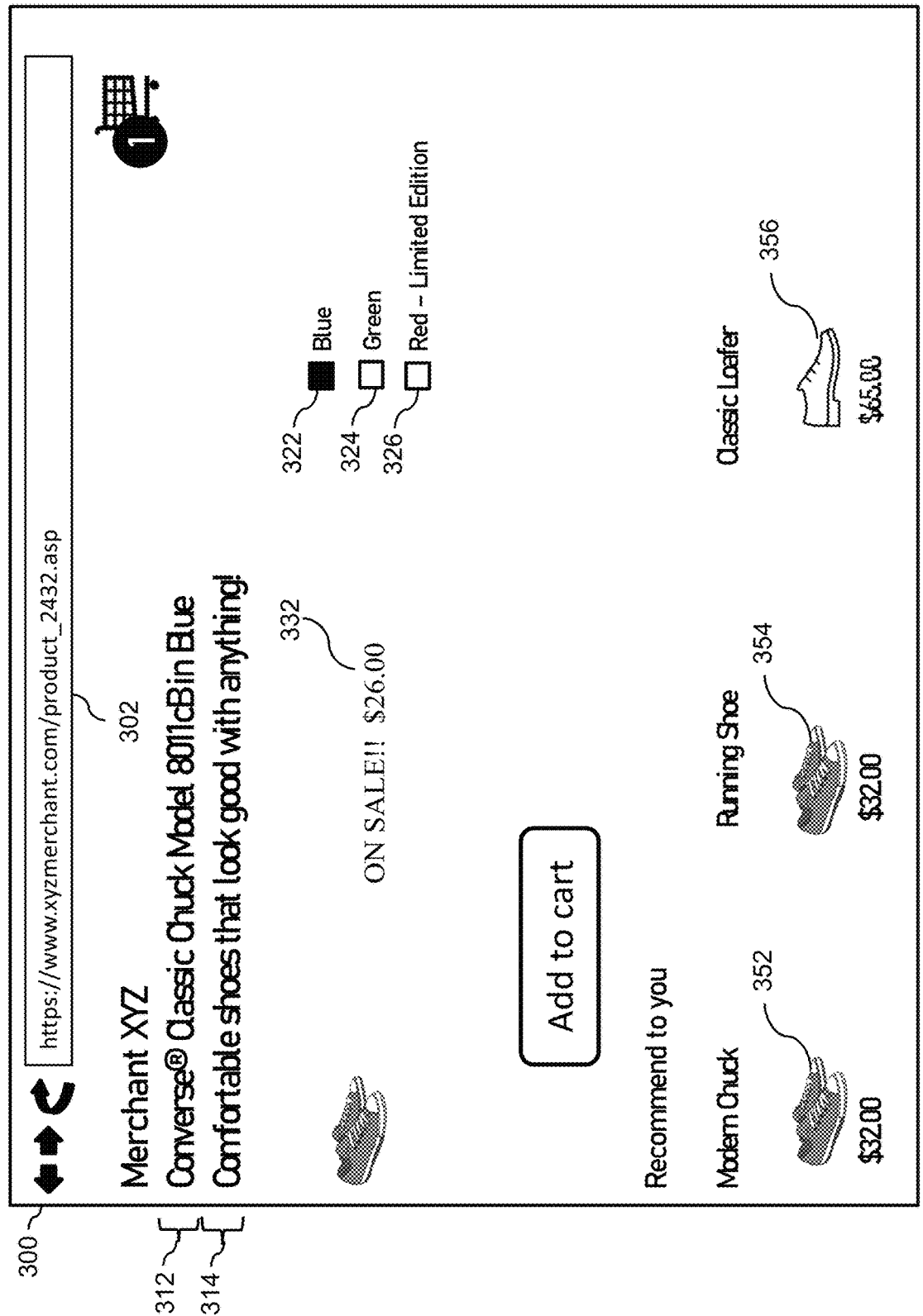
FIG. 3B illustrates an exemplary version of a product webpage after a selection of a selectable element according to an embodiment of the present disclosure.

FIG. 3B illustrates a version of the webpage 300 that is rendered after selecting the selectable element 322. As shown, this particular version of the webpage 300 includes data that is different from the webpage 300 before the selection of the selectable element 322. For example, the selectable element 322 appears solid while the other unselected selectable elements 324 and 326 remain hollow, indicating that the selectable element 322 has been selected. The product description 312 has been changed to specify a particular configuration of the product model, as it reads "Converse® Classic Chuck Model 8011cB in Blue." In addition, this version of the webpage 300 indicates an actual price 332 of "$26.00" for the product. The product determination module 214 may extract the data from this version of the webpage 300 and may identify a single product record (e.g., the product record 224) for this version of the webpage 300 corresponding to the blue Classic Chuck product.

In some embodiments, the currency verification module 216 may determine the currency used to present the price 332 of the product presented on the webpage 300 using the currency symbol appears in the price 332 and the identified product record 224. As discussed herein, the product record 224 may include prices grouped in different currencies. The currency verification module 216 may first select groups of prices that are associated with the same currency symbol as the one appears in the price 332. The currency verification module 216 may then select one group of prices by comparing the price 332 against the different groups of prices. For example, the currency verification module 216 may select a group of prices that are most similar to the price 332.

As shown in FIG. 3B, in addition to the Converse® Classic Chuck, the webpage 300 also displays other products under the section "Recommend to you." Those other products include a modern chuck product 352, a running shoe product 354, and a classic loafer product 356. In this example, prices are also presented for each of these products 352, 354, and 356. As such, in some embodiments, the purchase assistance module 132 may also use the same techniques disclosed herein to determine a currency for at least one of the products 352, 354, and 356, based on the prices shown on the webpage 300 in association with the products 352, 354, and 356, and product records that are identified for the products 352, 354, and 356. The currency verification module 216 may then further verify the currency determined for the webpage 300 based on the prices listed for the products 352, 354, and 356.

Figure 3C:
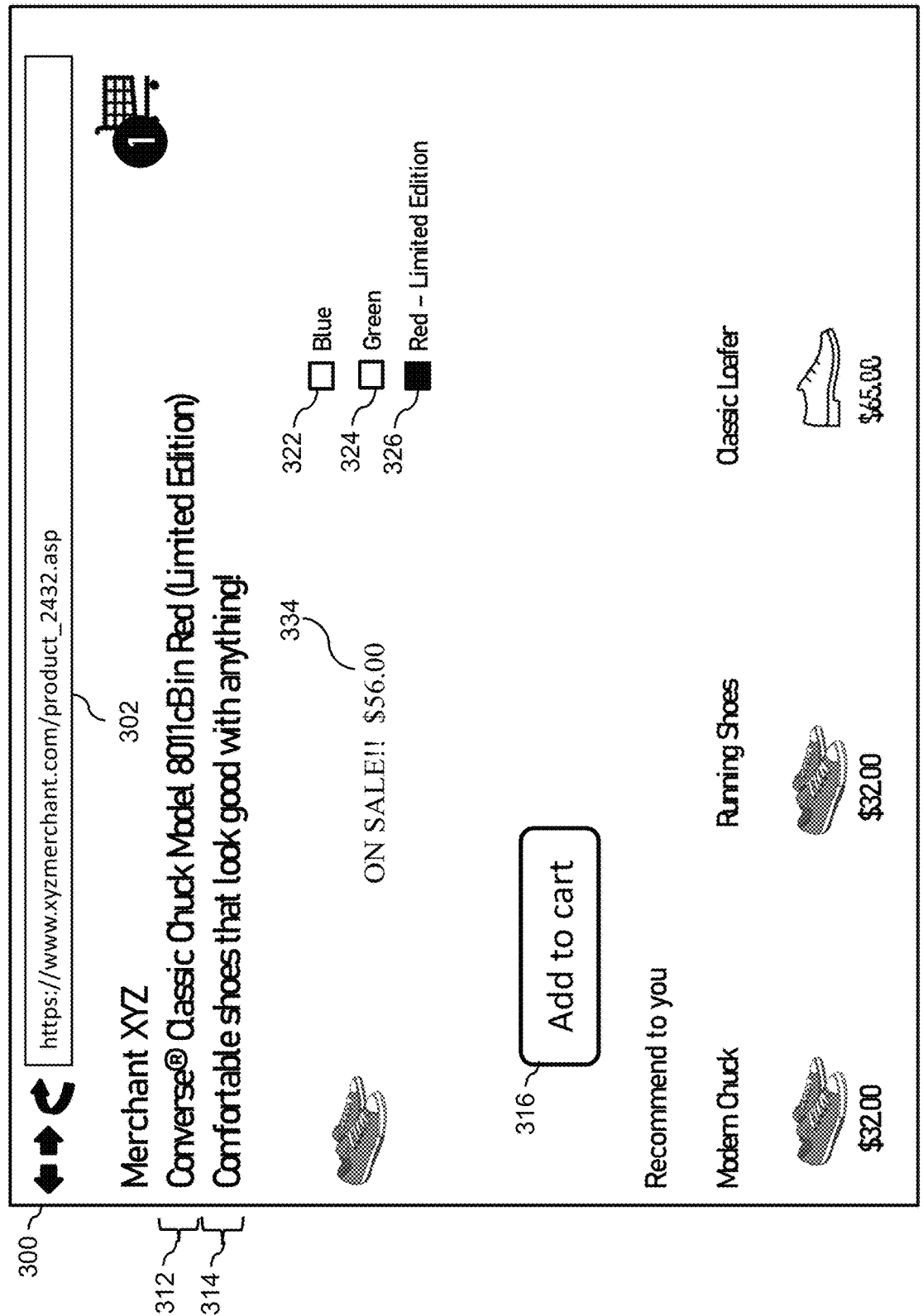
FIG. 3C illustrates another exemplary version of a product webpage after a selection of another selectable element according to an embodiment of the present disclosure.

After identifying the product record and verifying the currency for the version of the webpage 300 corresponding to the blue Classic Chuck product, the purchase assistance manager 212 may select (or cause the remote server to select) another selectable element, such as the selectable element 326. FIG. 3C illustrates another version of the webpage 300 that is rendered after selecting the selectable element 322. As shown, this particular version of the webpage 300 includes data that is different from the webpage 300 before the selection of any selectable elements and different from the version of the webpage 330 corresponding to after the selection of the selectable element 322. For example, the selectable element 326 in this version of the webpage 300 appears solid while the other unselected selectable elements 322 and 324 remain hollow, indicating that the selectable element 326 has been selected. The product description 312 has been changed to specify a particular configuration of the product model, as it reads "Converse® Classic Chuck Model 8011cB in Red (Limited Edition)." In addition, this version of the webpage 300 indicates an actual price 334 "$56.00" for the product, which is higher than the price of the same product model but in blue color, as illustrated in FIG. 3B. The product determination module 314 may extract the data from this version of the webpage 300 and may identify a single product record (e.g., the product record 222) for this version of the webpage 300 corresponding to the red Limited Edition Classic Chuck product.

The purchase assistance manager 212 may generate additional content for the different versions of the webpage 300 based on the data stored in the product records 222 and 224 and the currency determined for the webpage 300. For example, the purchase assistance manager 212 may generate first additional content for the version of the webpage 300 corresponding to the limited edition Converse® Classic Chuck based on the data in the product record 222, and may generate second additional content for the other version of the webpage 300 corresponding to the regular edition (e.g., the blue and/or the green color) Converse® Classic Chuck. The purchase assistance manager 212 may transmit the first and second additional content to the purchase assistance extension 116 of the user device 110 such that the purchase assistance extension 116 may enhance the webpage 300 presented on the user device 110 based on the first and second additional content.

In some embodiments, the extension manager 202 may continue to monitor the webpage 300 presented on the user device 110 via the user interface application 112, and may provide relevant additional content on the webpage 300. For example, the extension manager 202 may generate one or more user interfaces that incorporate the additional content received from the purchase assistance module 132, and may present the user interfaces on the webpage 300. In this example, the extension manager 202 may generate a first user interface for the version of the webpage 300 corresponding to the Limited Edition Converse® Classic Chuck and incorporate data from the first additional content within the first user interface. The extension manager 202 may also generate a second user interface for the version of the webpage 300 corresponding to the regular edition Converse® Classic Chuck and incorporate data from the second additional content within the second user interface.

As the extension manager 202 monitors the webpage 300 on the user device 110, the extension manager 202 may detect different versions of the webpage 300 being presented on the user device 110. For example, the extension manager 202 may detect that an interaction of the user with the webpage 300 (e.g., selecting the selectable element 322) has caused the version of the webpage 300 corresponding to the regular edition of Converse® Classic Chuck to be presented on the user device 110. In response to detecting that the version of the webpage 300 is presented, the extension manager 202 may modify the webpage 300 by incorporating additional content to the webpage 300. For example, the extension manager 202 may, for example by making application programming interface (API) calls with the user interface application 112, present the second user interface including the second additional content on the user device 110 (e.g., superimposing the second user interface on the webpage 300).

Figure 3D:
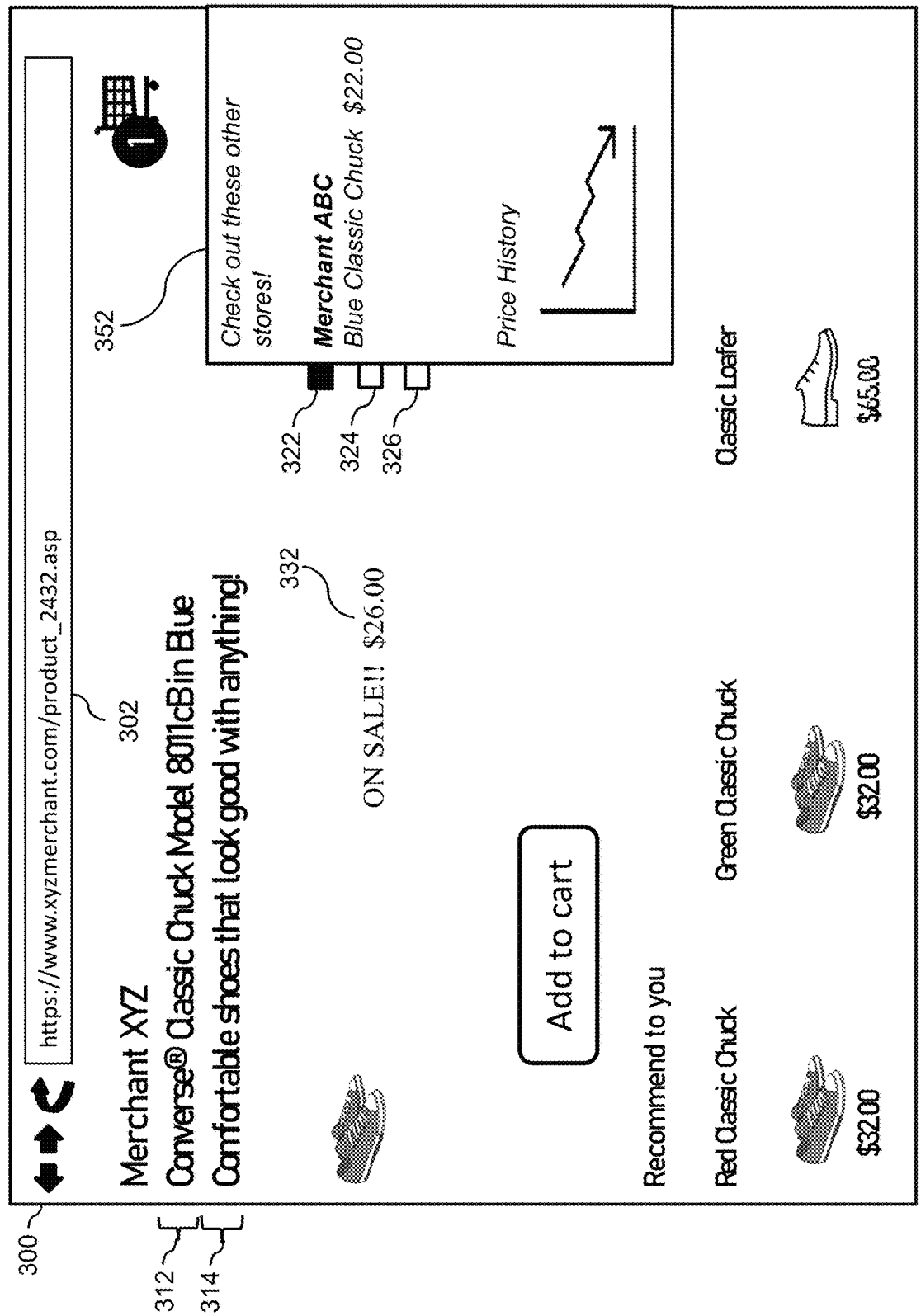
FIG. 3D illustrates an exemplary user interface superimposed on a product webpage according to an embodiment of the present disclosure.

FIG. 3D illustrates the webpage 300 that has been incorporated with additional content provided by the purchase assistance extension 116. In the example shown in FIG. 3D, the user 140 has selected the selectable element 322. As a result, the version of the webpage 300 corresponding to the regular edition of Converse® Classic Chuck is presented on the user device 110 through the user interface application 112. The extension manager 202 may then present a user interface 352 on the user device 110. The user interface 352 includes additional content (e.g., the second additional content received from the purchase assistance module 132) that is relevant to the version of the webpage 300 presented on the user device 110. In this example, the user interface 352 may include information associated with an offer for selling the blue Converse® Classic Chuck by another merchant (e.g., Merchant ABC) at a lower price (e.g., $22.00). In some embodiments, the user interface 352 may also include a link to another webpage associated with Merchant ABC. In response to receiving a selection of the link via the user interface 352, the extension manager 202 may redirect the user from the webpage 300 to the webpage associated with Merchant ABC, where the user 140 may purchase the same product at the lower price from Merchant ABC.

FIG. 4 illustrates an example product record 400 according to various embodiments of the disclosure. In some embodiments, the product record 400 may be generated by the purchase assistance module 132 and stored in the product catalog 220. As shown in FIG. 4, the product record 400 may include one or more data fields and data values. For example, the product record 400 may include a brand data field with corresponding data that indicates the brand (e.g., "American Eagle Outfitters") of the product corresponding to the product record 400. The product record 400 may also include other data fields, such as one or more URLs of webpages that offer the product for sale, a product category of the product, one or more prices of the products and the corresponding currency used in the prices, a product description of the product, an image (or a pointer or a network address associated the image) of the product, and other information associated with the product. The data within the product record 400 can be used by the purchase assistance manager 212 to generate additional content for webpages that present the corresponding product.

FIG. 5 illustrates an example data structure 500 for storing data extracted from a webpage. In some embodiments, the data structure 500 may be generated by the extension manager 202 for storing data extracted from webpages (e.g., the webpage 300). As discussed herein, the data structure generated by the extension manager 202 for storing data extracted from webpages may include multiple data fields. As shown in FIG. 5, the data structure 500 includes a store identifier field that indicates an identity of a merchant associated with a webpage, a title of the webpage, a price extracted from the webpage, a URL associated with the webpage, and possibly other information extracted from the webpage. In some embodiments, as the webpage scraper 204 scrapes a webpage, the extension manager 202 may populate the data structure 500 using data extracted from the webpage by the webpage scraper 204, and may transmit the populated data structure 500 to the purchase assistance module 132 to perform the purchase assistance functionalities as disclosed herein.

Figure 6:
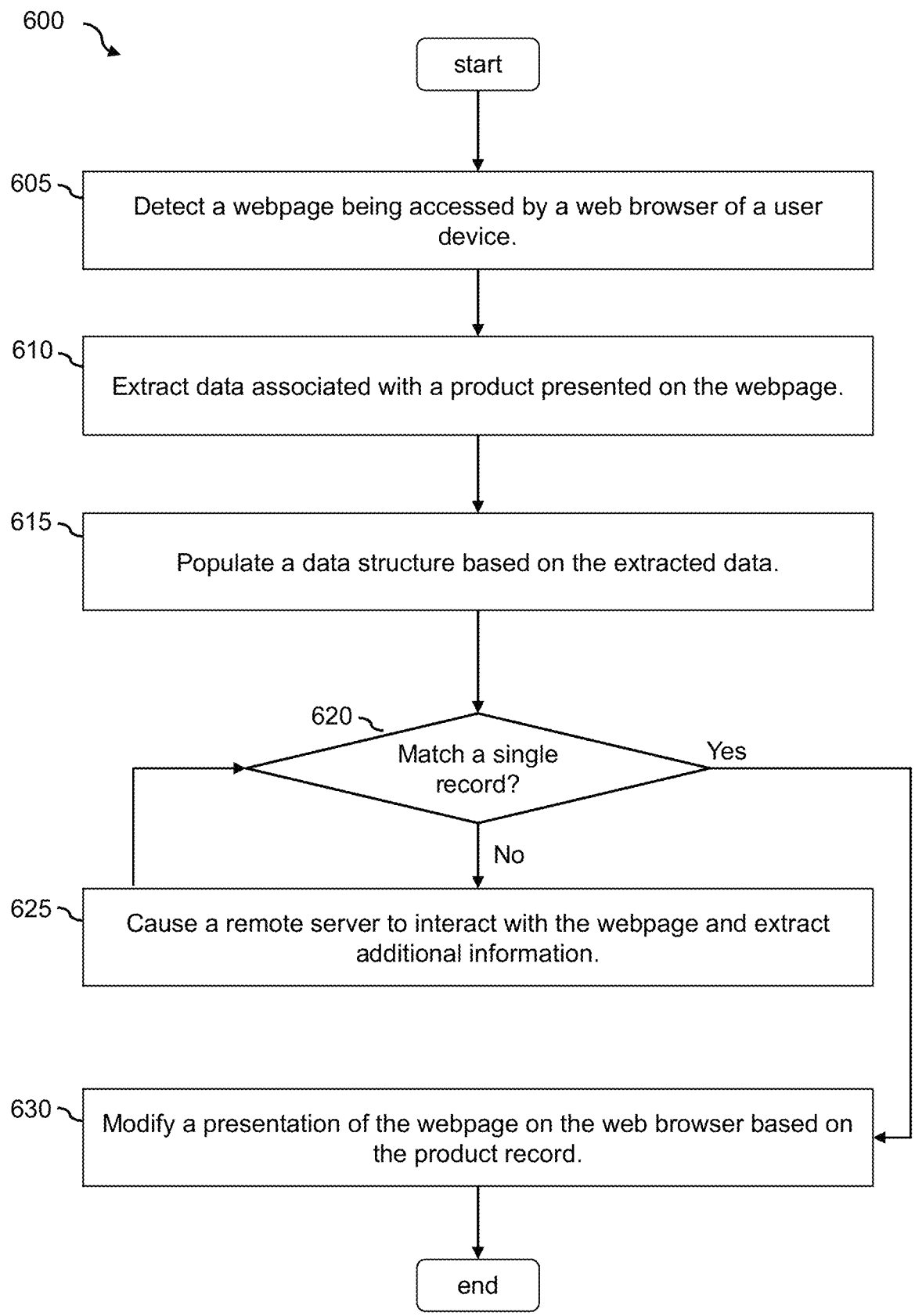
FIG. 6 is a flowchart showing a process of determining a product presented on a webpage according to an embodiment of the present disclosure.

FIG. 6 illustrates a process 600 for detecting a product presented on a webpage according to various embodiments of the disclosure. In some embodiments, at least a portion of the process 600 may be performed by the purchase assistance system 200. Note that one or more steps, processes, and methods described herein of process 600 may be omitted, performed in a different sequence, or combined as desired or appropriate. The process 600 begins by detecting (at step 605) a webpage being accessed by a web browser of a user device. For example, the extension manager 202 may monitor activities of the user interface application 112 (e.g., through APIs of the user interface application 112). The extension manager 202 may detect that a webpage is being accessed by the user interface application 112 (e.g., by detecting a transmission of a HTTP request by the user interface application 112 and a receipt of a webpage file, such as an HTML file, by the user interface application 112).

The process 600 then extracts (at step 610) data associated with a product presented on the webpage and populates (at step 615) the data structure based on the extracted data. For example, the webpage scraper 204 may obtain data associated with the webpage by scraping the webpage. The extension manager 202 may extract, from the data obtained from the webpage (which may include the URL of the webpage, text data and other multi-media data presented on the webpage, and programming logic implemented within the webpage, etc.). In some embodiments, the extension manager 202 may generate a data structure (e.g., the data structure 500 of FIG. 5) that has predefined data fields, and may populate the data fields with data extracted from the webpage.

At step 620, the process 600 determines whether a single record is matched based on the data structure, and modifies (at step 630) a presentation of the webpage on the web browser based on the product record. For example, the extension manager 202 may transmit the data structure to the purchase assistance module 132. Upon receiving the data structure, the product determination module 214 may match the webpage with one or more product records in the product catalog 220 based on the data in the data structure. The goal is to identify a single product record for the webpage. If a single product record is determined as a match for the webpage, the purchase assistance manager 212 may generate additional content for the webpage based on the data stored in the product record, and may transmit the additional content to the purchase assistance extension 116. The webpage modification module 206 may then modify the webpage based on the additional content. For example, the webpage modification module 206 may superimpose a user interface that includes the additional content onto the webpage.

However, if it is determined at the step 620 that multiple records are matched based on the data structure, the process 600 causes (at step 625) a remote server to interact with the webpage and extract additional content. For example, when the product determination module 214 determines multiple product records that are possible matches for the webpage based on the data structure, the purchase assistance manager 212 may access and interact (or cause a remote server to access and interact) with the webpage. For example, the purchase assistance manager 212 (or the remote server) may use a web browser to access the webpage independently and separately from the user device 110. The purchase assistance manager 212 (or the remote server) may determines selectable elements within the webpage and may iteratively selecting the selectable elements. Upon selecting a selectable element, the purchase assistance manager 212 may determine if the presentation of the webpage has changed, and if so, extracts data from the new presentation of the webpage. The extracted data may provide additional information of a product presented on the webpage (e.g., a particular configuration, etc.). The purchase assistance manager 212 may use the additional information to identify a single product record from the possible matches. Once a single product record is identified, the process may proceed to step 630 to modify the presentation of the webpage based on data stored in the product record.

Figure 7:
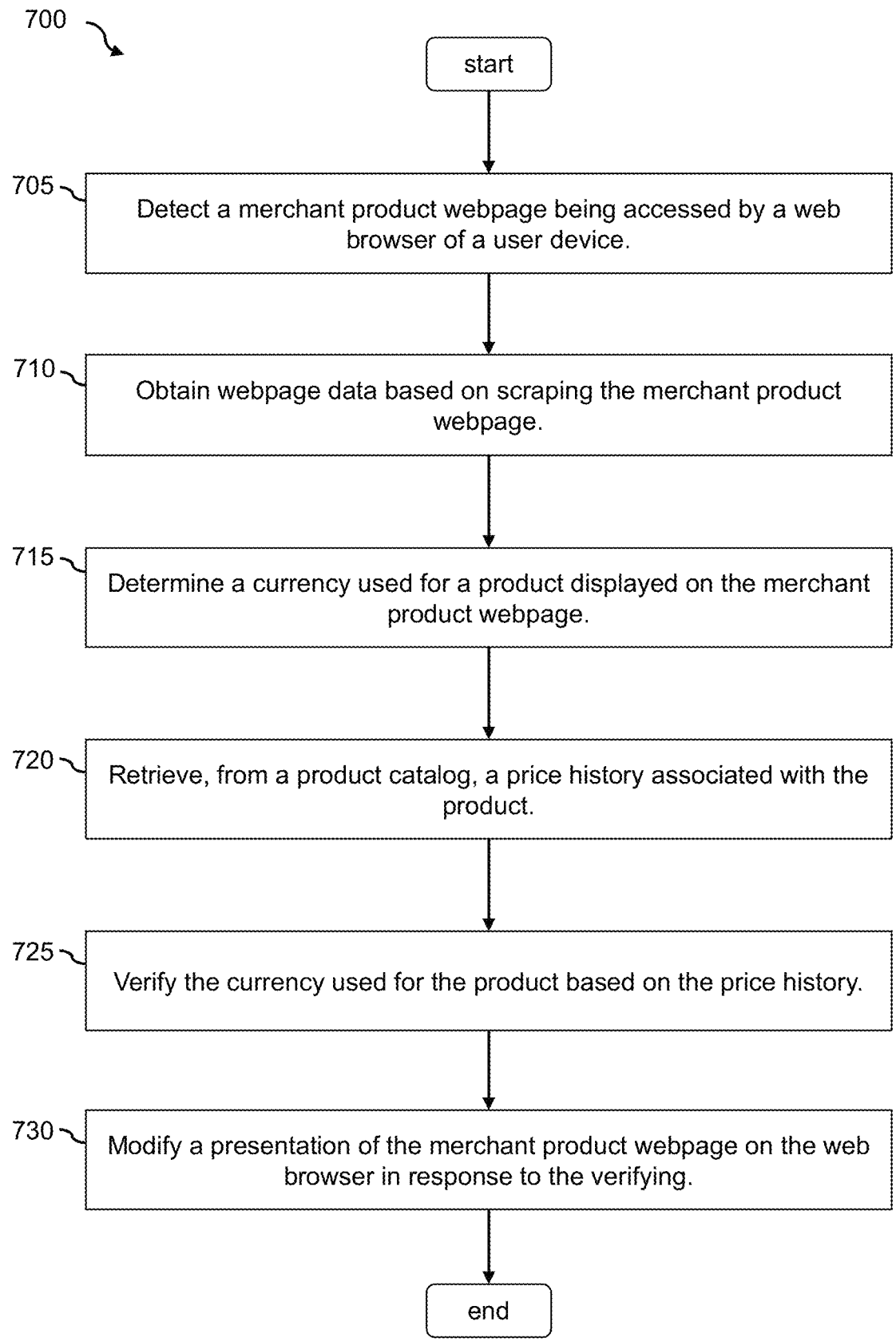
FIG. 7 is a flowchart showing a process of determining a currency used in presenting a price on a webpage according to an embodiment of the present disclosure.

FIG. 7 illustrates a process 700 for determining a currency used to present a price on a webpage according to various embodiments of the disclosure. In some embodiments, at least a portion of the process 700 may be performed by the purchase assistance system 200. Note that one or more steps, processes, and methods described herein of process 700 may be omitted, performed in a different sequence, or combined as desired or appropriate. The process 700 begins by detecting (at step 605) a merchant product webpage being accessed by a web browser of a user device. For example, the extension manager 202 may monitor activities of the user interface application 112 (e.g., through APIs of the user interface application 112). The extension manager 202 may detect that a webpage is being accessed by the user interface application 112 (e.g., by detecting a transmission of a HTTP request by the user interface application 112 and a receipt of a webpage file, such as an HTML file, by the user interface application 112).

The process 700 then obtains (at step 710) webpage data based on scraping the merchant product webpage, and determines (at step 715) a currency used for a product displayed on the merchant product webpage. For example, the webpage scraper 204 may obtain data associated with the webpage by scraping the webpage. The extension manager 202 may extract, from the data obtained from the webpage a price of a product that is presented on the webpage. In some embodiments, the extension manager 202 may identify a price within the data obtained from the webpage based on a currency symbol within the price. The extension manager 202 may transmit the price, along with other data obtained from the webpage, to the purchase assistance module 132. The currency verification module 216 may determine one or more currencies based on the currency symbol associated with the price. For example, if the currency symbol is a '$,' the currency verification module 216 may determine that the currency used to display the price on the webpage may be one of U.S. Dollars, Canadian Dollars, Hong Kong Dollars, Australian Dollars, and possibly other currencies that use that symbol.

The process 700 retrieves (at step 720), from a product catalog, a price history associated with the product, and verifies (at step 725) the currency used for the product based on the price history. For example, the product determination module 214 may identify a single product record from the product catalog 220 that matches the webpage using the techniques disclosed herein. The currency verification module 216 may access the price history of the product from the product record. In some embodiments, the product record may include multiple price history corresponding to different currencies. Thus, the currency verification module 216 may determine which price history the price of the product obtained from the webpage tracks the closest, and may determine the currency used for that price history.

The process 700 then modifies (at step 730) a presentation of the merchant product webpage on the web browser in response to the verifying. For example, the purchase assistance manager 212 may generate additional content based on the data from the product record. Specifically, the purchase assistance manager 212 may include the price history with which the price of the product tracks most closely in the additional content for presenting to the user. Furthermore, the purchase assistance manager 212 may also include information about other offers by other merchants associated with the product in the verified currency in the additional content. The purchase assistance manager 212 may transmit the additional content to the purchase assistance extension 116. The webpage modification module 206 may then modify the webpage based on the additional content. For example, the webpage modification module 206 may superimpose a user interface that includes the additional content onto the webpage.

Figure 8:
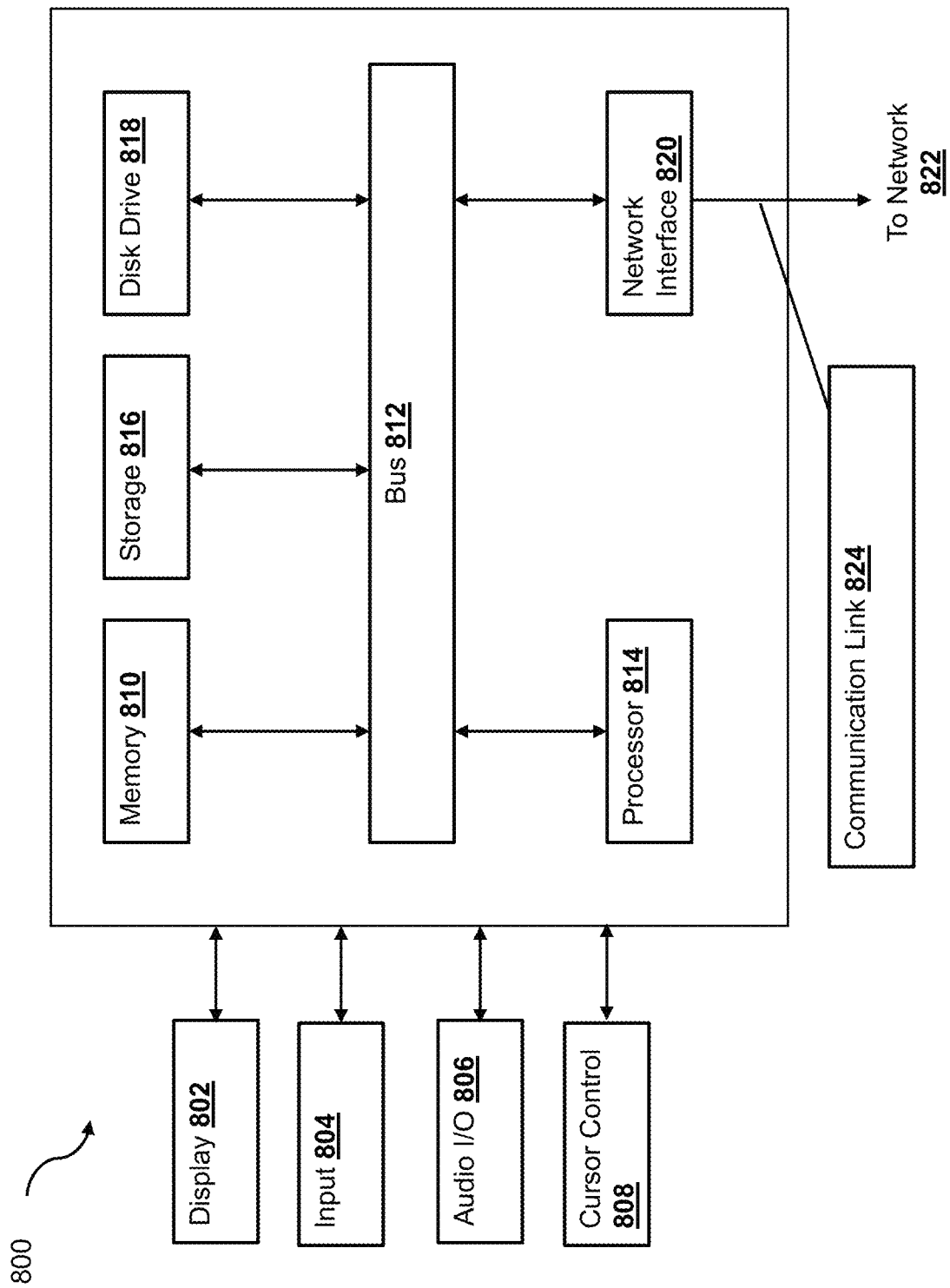
FIG. 8 is a block diagram of a system for implementing a device according to an embodiment of the present disclosure.

FIG. 8 is a block diagram of a computer system 800 suitable for implementing one or more embodiments of the present disclosure, including the service provider server 130, the merchant servers 120, 180, and 190, and the user device 110. In various implementations, the user device 110 may include a mobile cellular phone, personal computer (PC), laptop, wearable computing device, etc. adapted for wireless communication, and each of the service provider server 130 and the merchant servers 120, 180, and 190 may include a network computing device, such as a server. Thus, it should be appreciated that the devices 110, 120, 130, 180, and 190 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 908 (such as a keyboard, keypad, mouse, etc.). The display 802 may be configured to present a login page for logging into a user account or a checkout page for purchasing an item from a merchant. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via network 822. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid-state drive, a hard drive). The computer system 800 performs specific operations by the processor 814 and other components by executing one or more sequences of instructions contained in the system memory component 810. For example, the processor 814 can perform the purchase assistance functionalities described herein according to the processes 600 and 700.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:
1. A method comprising:
determining, by one or more hardware processors, a webpage being accessed by a user device via a user interface, wherein the webpage comprises a particular product of a merchant;

extracting, by the one or more hardware processors from the webpage, data associated with the particular product;

determining, based on the extracted data, that the webpage is associated with two or more product records from a plurality of product records stored in a product catalog;

in response to determining that the webpage is associated with the two or more product records, causing a computing device different from the user device to: (i) access the webpage using a browser application of the computing device, (ii) interact, via the browser application, with each user interface element in a plurality of user interface elements on the webpage, wherein the interacting with each user interface element causes the webpage to change a presentation of the particular product, and (iii) obtain additional data associated with changes to the presentation of the particular product based on the interacting, wherein the additional data is compared against each product record of the two or more product records;

determining that the webpage being accessed by the user device is associated with a particular product record from the two or more product records based on the additional data;

modifying, by the one or more hardware processors, the webpage that is accessed by the user device to include the additional data based on the particular product record without redirecting the user device away from the webpage that is being accessed by the user device; and displaying the modified webpage via the user interface of the user device.

2. The method of claim 1, wherein the modifying the webpage comprises superimposing, on the webpage, a second presentation that presents one or more offers associated with the particular product offered by one or more merchants different from the merchant.

3. The method of claim 2, wherein the second presentation includes a link to a second webpage associated with a second merchant different from the first merchant.

4. The method of claim 3, further comprising:
receiving a selection of the link via the user interface; and
causing the user device to redirect the user to the second webpage.

5. The method of claim 3, further comprising:
determining a currency used to present a price of the particular product on the webpage, wherein the link is selected based on the currency.

6. The method of claim 1, wherein the extracted data comprises a source code of the webpage.

7. The method of claim 1, wherein each user interface element in the plurality of user interface elements corresponds to a different product configuration of the particular product.

8. A non-transitory machine-readable medium having stored thereon machine-readable instructions executable to cause a machine to perform operations comprising:

determining a webpage being accessed by a user device via a user interface, wherein the webpage comprises a representation of a particular product of a merchant;

extracting, by the one or more hardware processors, data associated with the particular product;

determining, based on the extracted data, that the webpage is associated with two or more product records from a plurality of product records stored in a product catalog;

in response to determining that the webpage is associated with the two or more product records, causing a remote device different from the user device to: (i) access the webpage using a browser application of the remote device, (ii) interact, via the browser application, with each user interface element in a plurality of user interface elements on the webpage, wherein the interacting with each user interface element causes the webpage to change a presentation of the particular product, and (iii) obtain additional data associated with changes to the presentation of the particular product based on the interacting, wherein the additional data is compared against each product record of the two of more product records;

determining that the webpage being accessed by the user device is associated with a particular product record from the two or more product records based on the additional data;

modifying the webpage being accessed by the user device to include the additional data based on the particular product record, without redirecting the user device away from the webpage that is being accessed by the user device; and displaying the modified webpage via the user interface of the user device.

9. The non-transitory machine-readable medium of claim 8, wherein the operations further comprise:
obtaining a uniform resource locator (URL) of the webpage, wherein the extracted data comprises the URL of the webpage.

10. The non-transitory machine-readable medium of claim 8, wherein each user interface element in the plurality of user interface elements corresponds to a different product configuration of the particular product.

11. The non-transitory machine-readable medium of claim 8, wherein the interacting with each of the plurality of user interface element comprises selecting a product configuration of the particular product.

12. The non-transitory machine-readable medium of claim 8, wherein the operations further comprise:
enumerating a plurality of product configurations based on the extracted data; and
selecting a particular product configuration from the plurality of product configurations.

13. The non-transitory machine-readable medium of claim 8, wherein the operations further comprise:
determining a location associated with the user device; and
selecting, from a plurality of remote devices, the remote device for accessing the webpage based on the location.

14. A system comprising:
a non-transitory memory; and
one or more hardware processors coupled with the non-transitory memory and configured to read instructions from the non-transitory memory to cause the system to perform operations comprising:
determining that a webpage is accessed by a user device via a user interface, wherein the webpage presents a particular product of a merchant;
extracting, from the webpage, data associated with the particular product;
determining, based on the extracted data, that the webpage is associated with two or more product records from a plurality of product records;
detecting that the webpage includes a plurality of user interface elements corresponding to different product configurations of the particular product;

causing a computing device different from the user device to: (i) access the webpage using an application of the computing device, (ii) interact, via the application, with each user interface element in the plurality of user interface elements on the webpage, wherein the interacting with each user interface element causes the webpage to change a presentation of the particular product, and (iii) obtain additional data associated with changes to the presentation of the particular product based on the interacting, wherein the additional data is compared against each product record of the two or more product records;

determining that the webpage being accessed by the user device is associated with a particular product record from the two or more product records based on the additional data;

modifying the webpage being accessed by the user device to include the additional data based on the particular product record without redirecting the user device away from the webpage that is being accessed by the user device; and displaying the modified webpage via the user interface of the user device.

15. The system of claim 14, wherein the modifying the webpage comprises superimposing, on the webpage, a second presentation that presents one or more offers associated with the particular product offered by one or more merchants different from the merchant.

16. The system of claim 15, wherein the second presentation includes a link to a second webpage associated with a second merchant.

17. The system of claim 16, wherein the operations further comprise:
   receiving a selection of the link via the user interface; and
   causing the user device to redirect a user to the second webpage.

18. The system of claim 16, wherein the operations further comprise:
   determining a currency used to present a price of the particular product on the webpage, wherein the link is selected based on the currency.

19. The system of claim 14, wherein the extracted data comprises a uniform resource locator (URL) of the webpage.

20. The system of claim 19, wherein the operations further comprise causing the computing device to access the webpage based on the URL.

* * * * *